May 19, 1959
W. F. PETERSON ET AL
2,886,867
PISTON MOLDING MACHINE
Filed Oct. 9, 1957
2 Sheets-Sheet 1
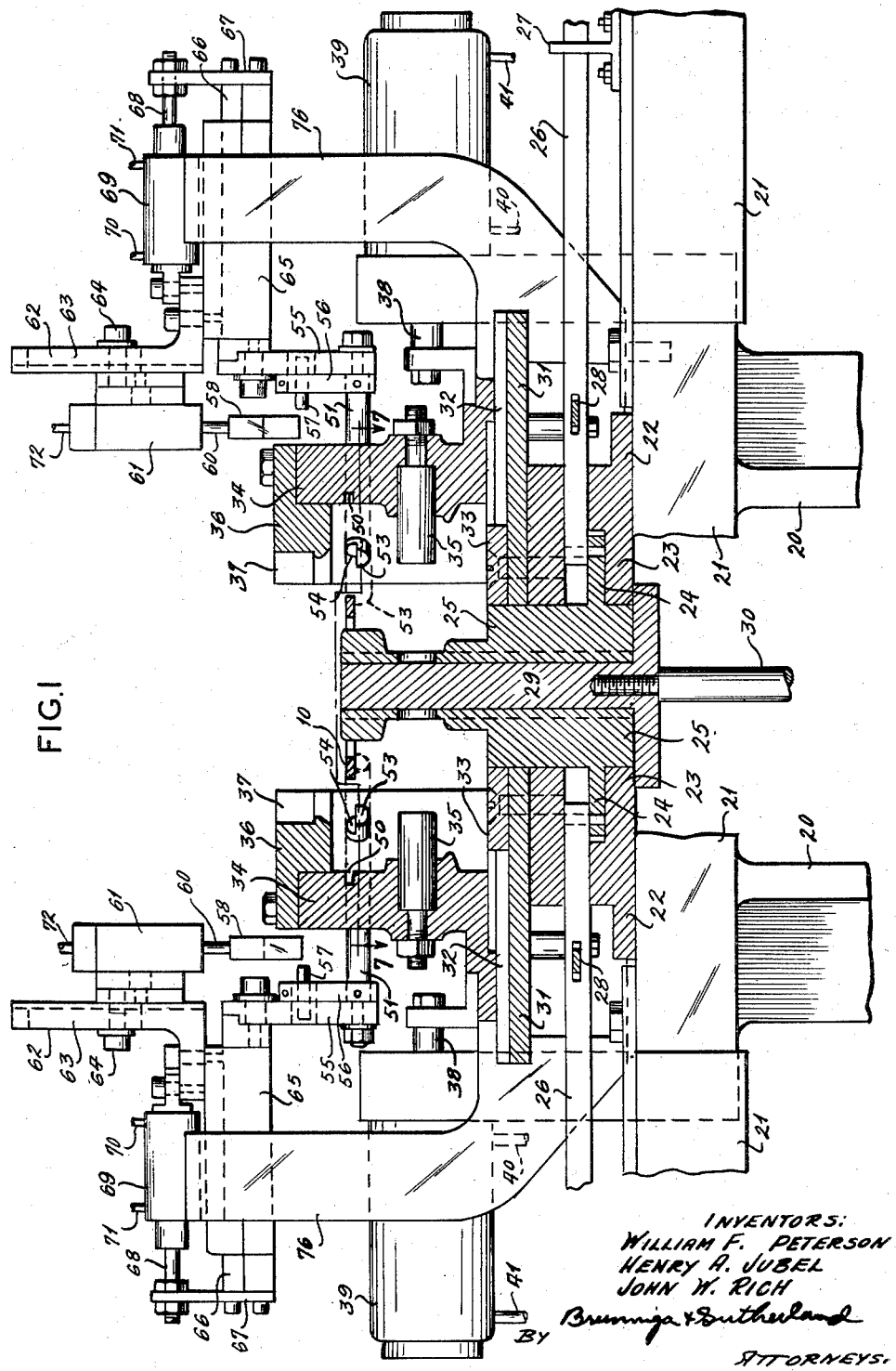
INVENTORS:
WILLIAM F. PETERSON
HENRY A. JUBEL
JOHN W. RICH
BY Brennija & Sutherland
ATTORNEYS.

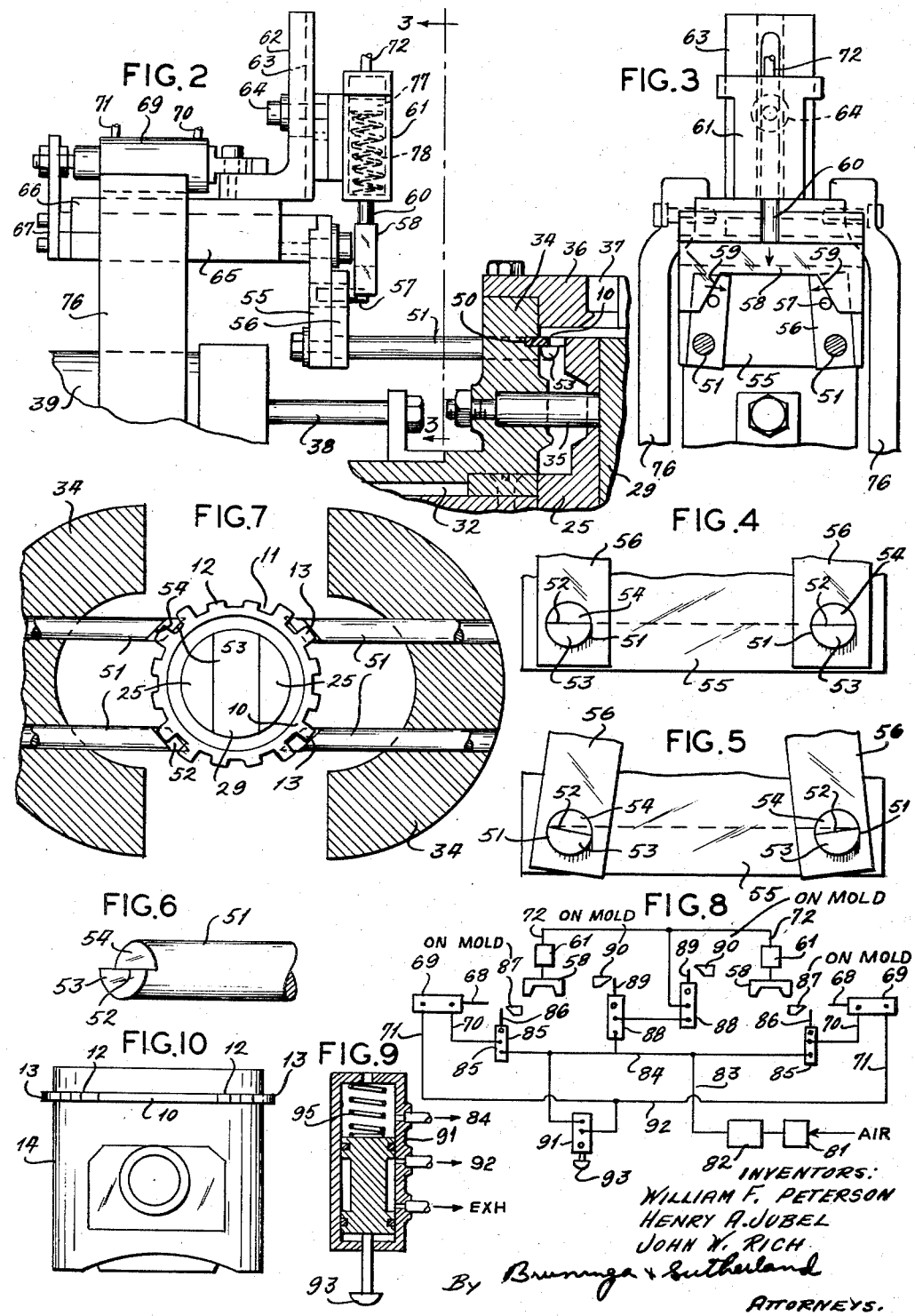

United States Patent Office 2,886,867
Patented May 19, 1959

2,886,867
PISTON MOLDING MACHINE

William F. Peterson, Creve Coeur, Henry A. Jubel, St. Louis County, and John W. Rich, Furgeson, Mo., assignors to Sterling Aluminum Products, Inc., St. Charles, Mo., a corporation of Missouri Application October 9, 1957, Serial No. 689,209

20 Claims. (Cl. 22—58)

This invention relates to an apparatus or machine for molding pistons and more particularly for molding a piston of a metal such as an aluminum or magnesium alloy over a piston ring groove protector.

In such a piston, more particularly one of the trunk type having wrist pin bosses, a head which is of smaller diameter than the skirt is provided with packing ring-receiving grooves into which are placed packing rings, usually of iron or steel. During the reciprocation of the piston, and particularly as used in automobile engines, these reciprocations are exceedingly rapid, causing the packing ring to hammer against the faces of the grooves. This results in a hammering action on the ring face, which makes the rings loose and therefore subject to leakage of gases. In order to prevent such hammering action on the metal of the piston body, piston ring groove protectors are incorporated into the piston body. An example of such a protector in the form of a ring, is shown in U.S. Patent 2,771,328, granted November 20, 1956, to applicant's assignee.

In molding a piston body over a packing ring groove protector, this protector ring must be placed accurately in the mold, not only circumferentially, but particularly axially of the piston body as cast thereover. That is for the reason that such a protector is made rather thin axially and of limited dimensions radially; it is therefore desired that after the cutting of the groove in such a protector, the thickness of the groove walls be rather uniform, and that the metal at the base of the groove be generally uniform radially.

One of the objects of this invention therefore is to provide a piston molding apparatus or machine having means for accurately positioning the protector in the mold, particularly axially thereof but also circumferentially thereof.

Further objects will appear from the detailed description in which will be set forth an illustrative embodiment of this invention; it is to be understood, however, that this invention is susceptible of various embodiments within the scope of the appended claims.

In the accompanying drawings:

Fig. 1 is a view partially in section and partially in elevation of a piston molding machine embodying this invention, with locating parts as shown in dotted lines, located to receive the protector ring, the mold halves being at that time separated with the locating parts shown in full lines.

Fig. 2 is a view of a part of Fig. 1 with the parts in position for molding.

Fig. 3 is a section on the line 3—3, Figure 2.

Figs. 4 and 5 are views of part of Fig. 3, showing the protector-locating parts in two positions.

Fig. 6 is a detail of one of the protector locating devices.

Fig. 7 is a section on the line 7—7, Fig. 1, showing the protector in place on the location devices.

Fig. 8 is a diagram of various parts of the machine to illustrate the operation.

Fig. 9 is a sectional view through one of the fluid valves.

Fig. 10 is a view of a piston with a protector molded in place.

The piston molding machine is generally of the construction of U.S. Patents 1,952,199, 2,204,407 and 2,588,898. In 1,952,199, Fig. 6, the mold halves and the side cores are moved manually, but the center core is moved in and out between the side cores by fluid pressure. In 2,204,407, the mold halves, as well as the center core, are moved by fluid pressure. In 2,588,898, a pair of molds of the general construction of those shown in 2,204,407, are mounted on a carrier. The molding machine may be of any of the above constructions, but the one illustrated approaches more closely to that of 2,204,407.

For illustrative purposes, the piston ring groove protector, shown in Figs. 7 and 10, is that shown in Figs. 4 and 5 of Patent 2,771,328. However, the protector may be any of those illustrated and may be of any suitable construction. Referring to Figs. 7 and 8 of this application, 10 designates a protector ring, which may be of one piece or of two pieces welded together, and of steel or cast iron. The outer periphery of the ring is notched as shown at 11, so as to provide a series of teeth 12 alternating with recesses. These teeth need not project beyond the piston body, but some of them shown at 13, may project beyond the piston body periphery. That is for the purpose of locating the protector in the mold as illustrated in Patent 2,771,328, Fig. 20. The protector is shown in the piston 14 in Fig. 10, after the piston metal has been cast around the protector. In the machining of the piston, the projecting parts 13 are cut off, and thereafter the ring grooves are cut into the protector in the manner shown in Patent 2,771,328, Fig. 22.

Referring now to the accompanying drawing, 20 designates the two side parts of the body of the machine, which support a base plate 21. Mounted on the base plate are brackets 22, having guides 23 for lugs 24 of the side cores 25. Each of these side cores is connected to a bar 26, guided by brackets 27 on the plate 21, and having handles 28 extending to the front of the machine, so that the side cores can be moved in and out. A center core 29 has a piston rod 30 movable in a cylinder as shown in Patent 2,204,407. Mounted on the brackets 22 are brackets 31, provided with guides 32 in which move gibs 33 on a pair of mold halves 34, each having a core 35 for forming the wrist pin holes, and each having a top half 36, provided with a gate 37. Each mold half is provided with a piston rod 38 attached to a piston moving in a cylinder 39, provided with fluid connections 40, 41.

The operation of the mechanism so far described, is substantially that described in Patent 2,204,407, namely: When the parts are in the position shown in Fig. 2, with the mold halves 34 closed, with a center core 29 up and the side cores 25 against the center core, the machine is ready for the molding of a piston. After pouring and solidification of the casting, the center core 29 is moved down below the side cores, the side cores are moved into the space vacated by the center core, and the mold halves are moved out as shown in Fig. 1, so that the piston casting can then be picked off.

Each mold half is provided with a recess 50 for receiving the extensions 13 of the protector ring 10. When the protector is so placed in the mold, the piston casting can be poured, so as to mold the piston body on the protector. After the cores have been collapsed, the mold halves moved out and the piston casting picked off, the piston will appear as in Fig. 10. We can hereafter refer to this protector as a ring.

In accordance with this invention, however, means are provided for accurately locating the ring in the mold. That means will now be described.

Referring to the drawing, a pair of locating devices 51 are provided for each mold half and they are in the form of rods, each of which is recessed to form shoulders 52, while the faces 53 and 54 extend generally along the circumference of the inside of the piston mold. These rods are so located that the shoulders 52 take under the projecting parts 13 of the ring at the bottom of the groove 50 in the mold halves. Their purposes are to accurately locate the ring in the mold circumferentially as well as axially of the cast molding.

The rods 51 are in pairs; one pair for each mold half. Each pair of rods is mounted rotatively in a mold half and rotatively in brackets 55, mounted on brackets 76, in turn mounted on the plate 21. Each rod of a pair has an arm 56 fixed thereto, and each of these arms has a pin 57 arranged for engagement by a cross piece 58, having cam faces 59. The cross piece is mounted on a rod 60, connected with a piston 77 (dotted Fig. 2), movable vertically in the cylinder 61, mounted on a bracket 62, and arranged for vertical adjustment by a slot 63 in the bracket in which moves a clamping screw 64. The piston in the cylinder 61 is moved upwardly by a spring 78 (dotted Fig. 2) and has a fluid pressure connection 72.

The pins 57 are normally out of the path of the cross piece 58 with its cams. In order to move the pins 57 into the path of the cross piece, and also to move the rods 51 into the mold, the bracket 55 is mounted to slide horizontally in a bracket 65 by a gib 66, connected by a cross head 67 to a rod 68, connected with a piston (not shown) moving in a cylinder 69, provided with fluid connections 70 and 71.

We will refer now to Fig. 8, which is diagrammatical and shows the cross heads 58, the cylinders 61, their fluid connections 72, and the cylinders 69 with their rods 68, and with their fluid connections 70 and 71. The mechanism for operating the various cylinders is as follows: Fluid pressure, such as air pressure, is applied through a strainer 81 and through an oiler 82 for incorporating some oil with the air. From the oiler, a connection 83 leads to a connection 84, extending to the bottom ports of the valves 85, each of which is of the piston type well-known in the art, but generally of the construction shown in Fig. 9, and each of which pistons has a rod 86 in the path of a cam 87, connected with each mold half and movable upon outward movement of the mold halves to engage 86. Piston halves 88, generally like that of Fig. 9 each have a rod 89 engageable by a cam 90, connected with each mold half, so as to be movable to engage 89 upon inward movement of the mold halves. The top of each of the halves 85 and 88 has an exhaust port, as shown, and therebelow two fluid inlet ports, the bottom of which is in communication with a connection 84. The middle ports of valves 85 are in communication with the fluid connection 70 to the cylinders 69. The valves 88 are in series, with the bottom port of the left valve in communication with a connection 84, with the middle port in communication with a bottom port on the right valve 88 and with the middle port of the right valve 88 in communication with connections 72 to the cylinders 61. A hand operated valve 91 has ports, the bottom of which is an exhaust port, while the top port is in communication with the connection 84, and with the middle port in communication with a connection 92 leading to the connections 71 to the cylinders 69. The stem of the valve 91 is provided with a button 93, connected with the piston valve, and the valve has a spring 95. The valves 85 and 88 are as noted above of a construction as in Fig. 9, likewise have springs to normally move the piston valves down, rather than up as in Fig. 9. The valves 85 and 88 may be visualized by considering Fig. 9 as turned upside down with the exhaust port on top and with the stem with its button 93 up in the positions of the rods 86 and 89.

The operation of the machine is as follows:

With the cores in place, as shown in Fig. 1, but with the mold halves separated, as shown also in Figs. 1 and 7, the button 93 is pressed against the tension of its spring 95, Fig. 9, to cause the valve 91 to connect the top and middle ports leading to 84 and 92 respectively, and to close the bottom exhaust port EXH. That causes fluid to flow from 81 by 82, 83 and 84, and by the top and middle ports of valve 91, to the connection 92, and from hence to the end connections 71 of the cylinders 69, the connections 70 at the inside ends of the cylinder 69 exhausting from the middle ports of 85 to the exhaust ports at the tops of 85. That causes the locators 51 to move inwardly to the position shown in Figs. 1 (dotted) and 7. The ring 10, having been previously heated to a temperature of about 600° F. is placed on the shoulders 52 of the locating bars 51 whose faces 54 locate the protector ring circumferentially in the mold. The mold halves are now closed by application of fluid pressure to the outer ends of the cylinders 39, which causes the recesses 50 on the inside of the mold to take under the edges 13 of the ring. The inward movement of the brackets 55 carrying the locating bars 51 has moved the pins 57 into "mesh" with a cross head 58 and its cams 59. Accordingly, upon inward movement of the mold halves, the cams 90, Fig. 8, connected to the mold halves, will engage the rods 89 of the piston valves 88, so as to connect the middle and bottom ports of these valves by the pistons of the valve in the same manner that the middle and bottom ports are connected in Fig. 9. That causes fluid to flow from 84 (previously connected through valves 91 to the fluid supply 81, 82, 92) through the valves 88, and to the connections 72 to the tops of the pistons 77 in the cylinder 61, causing the cross heads 58 to move downwardly. The downward movements of the cross head will cause the cams 59 thereof, to engage the pins 57, so as to rock the arms 56, and cause the shoulders 52 of the locating rods 51 to press the protector ring 10 with its extending parts 13 against the top of the groove 50 in the mold halves in order to level the ring in the mold.

The metal is now poured through the gate 37 to form the piston. After solidification, the mold halves are moved outwardly to open the mold and the center core 29 is moved down from between the side cores, which are moved inwardly into the vacant space left by the center core. The piston casting can now be picked off and will appear as in Fig. 10.

During the outward movement of the mold halves, the cams 87 connected with the mold halves will move outwardly to engage the rods 86 of the piston valves 85, in order to connect the middle and bottom ports in the same manner that the middle and bottom parts are connected in Fig. 9. That will cause fluid pressure to be applied from 84 to the connections 70 at the inner ends of cylinders 69, while the outer connections 71 are connected by 92 to the middle port of valve 91, which is at that time, connected with the exhaust port, as shown at Fig. 9 because the button 93 has been released to connect 71 to 92 to the bottom exhaust port. Accordingly, the pistons in the cylinders 69 will move outwardly to move the locating rods 51 out of the mold to the position shown in Fig. 1.

The outward movement of the mold halves will also move the cams 90 out of engagement with the rods 89 of the valves 88, so that the connection 72 to the cylinders 61 will be connected to the exhaust (top) of valves 88, in order to permit the spring in the cylinder 61 to move the cross head 58 up so as to release the pins 57 and the locating rods 51. The machine is now ready for another operation.

It will therefore be seen that the invention accomplishes its objects. A simple mechanism is provided for molding a piston over a piston ring groove protector ring. This ring is not only located circumferentially in the mold, but is leveled axially within the mold cavity. According, the protector ring will be in a position where it can be machined to not only eliminate the locating projections 13, but to also be machined to form the packing ring grooves.

Having thus described the invention, what is claimed and desired to be secured by Letters Patent is:

1. A piston molding apparatus, comprising, an outer mold, means for receiving a ring and positioned to locate the same axially within the mold cavity, and means operating on said receiving means adapted to level the ring flatwise in the mold cavity.

2. A piston molding apparatus, comprising, an outer mold, means for receiving a ring and positioned to locate the same axially within the mold cavity, and means for shifting said receiving means adapted to level the ring flatwise in the mold cavity.

3. A piston molding apparatus, comprising, an outer mold, means for receiving a ring, means for moving said receiving means adapted to locate the same axially within the mold cavity, and means for moving said receiving means adapted to locate the ring circumferentially within the mold cavity.

4. A piston molding apparatus, comprising, an outer mold, means for receiving a ring and positioned to locate the same axially within the mold cavity, means for moving said receiving means adapted to locate the ring circumferentially within the mold cavity, and means for moving said receiving means adapted to level the ring flatwise in the mold cavity.

5. A piston molding apparatus, comprising, an outer mold which is internally recessed to receive the outer edge of a ring adapted to locate the ring circumferentially within the mold cavity, and means engageable by the edge of the ring adapted to locate the same axially within the recess.

6. A piston molding apparatus, comprising, an outer mold which is internally recessed to receive the outer edge of a ring adapted to locate the ring circumferentially within the mold cavity, means engageable by the edge of the ring adapted to locate the same axially within the recess, and means operating on said last means adapted to level the ring flatwise in the mold cavity.

7. A piston molding apparatus, comprising, an outer mold which is internally recessed to receive the outer edge of a ring adapted to locate the ring circumferentially within the mold cavity, means engageable by the edge of the ring adapted to locate the same axially within the recess, and means for shifting said last means adapted to position the ring axially against an axial edge of said recess.

8. A piston molding apparatus, comprising, an outer sectional mold, and means projecting into the mold cavity when open for receiving the rim of a ring and positioned to locate the same axially within the open mold cavity, adapted on closing of the mold to position said receiving means inside of the mold cavity.

9. A piston molding apparatus, comprising, an outer sectional mold which is internally recessed to receive the outer edge of the ring, and means projecting into the mold cavity when open for receiving the rim of a ring and positioned to locate the same axially within the open mold cavity and axially at the level of the recess, adapted on closing of the mold to position said receiving means inside of the mold cavity with the ring edge in the recess.

10. A piston molding apparatus, comprising, an outer mold which is internally recessed to receive the outer edge of a ring adapted to locate the ring circumferentially within the mold cavity, and means projecting into the mold cavity when the mold is open and engageable by the edge of the ring adapted to locate the same axially at the level of the recess, adapted on closing of the mold to position said receiving means inside of the mold cavity with the ring edge in the recess.

11. A piston molding apparatus, comprising, an outer sectional mold, means projecting into the mold cavity when open for receiving the rim of a ring and positioned to locate the same axially within the mold cavity, and means operating on said locating means adapted to level the ring flatwise in the mold cavity, said receiving means being adapted on closing of the mold to position said receiving means inside of the mold cavity.

12. A piston molding apparatus, comprising, an outer mold, locating elements projectible into the mold cavity and engageable by the edge of a ring, and means for shifting said elements adapted to level the ring flatwise in the mold cavity.

13. A piston molding apparatus, comprising, an outer mold, and locating elements projectible into the mold cavity when the mold is open and engageable by the edge of a ring, and means for shifting said elements adapted to level the ring flatwise in the mold cavity adapted when the mold is closed to position said elements inside of the mold cavity.

14. A piston molding apparatus, comprising, an outer mold, locating elements projectible into the mold cavity when the mold is open and engageable by the edge of a ring, and means for shifting said elements adapted to level the ring flatwise in the mold cavity and adapted when the mold is closed to position said elements inside of the mold cavity.

15. A piston molding apparatus, comprising, mold sections, means for moving said sections to open and close the mold cavity, means for receiving a ring and positioned to locate the same axially within the mold cavity, and means operated upon closing of the mold sections adapted to level the ring flatwise in the mold cavity.

16. A piston molding apparatus, comprising, mold sections, means for moving said sections to open and close the mold cavity, means for receiving a ring and positioned to locate the same axially within the mold cavity, and means operated upon opening of the mold adapted to move said receiving means away from the casting in the mold cavity.

17. A piston molding apparatus, comprising, mold sections, means for moving said sections to open and close the mold cavity, means for receiving a ring and positioned to locate the same axially within the mold cavity, means operated upon closing of the mold sections adapted to level the ring flatwise in the mold cavity, and means operated upon opening of the mold adapted to move said receiving means away from the casting in the mold cavity.

18. A piston molding apparatus, comprising, mold sections, means for moving said sections to open and close the mold cavity, means for receiving a ring, means for moving said receiving means to locate the same axially in the mold cavity, and means operated upon opening of the mold adapted to move said receiving means away from the casting in the mold cavity.

19. A piston molding apparatus, comprising, mold sections, means for moving said sections to open and close the mold cavity, means for receiving a ring and positioned to locate the same axially within the mold cavity, means operated upon closing of the mold sections adapted to level the ring flatwise in the mold cavity, and means operating upon opening of the mold adapted to return said leveling means.

20. A piston molding apparatus, comprising, mold sections, means for moving said sections to open and close the mold cavity, means for receiving a ring and positioned to locate the same axially within the mold cavity, means operated upon closing of the mold sections adapted to level the ring flatwise in the mold cavity, and means operating upon opening of the mold adapted to return said leveling means and to move said receiving means away from the casting in the mold.

References Cited in the file of this patent

UNITED STATES PATENTS

| | | |
|---|---|---|
| 844,389 | Neureuther | Feb. 19, 1907 |
| 1,532,639 | Sondley | Apr. 7, 1925 |
| 2,620,530 | Sulprizio | Dec. 9, 1952 |